Nov. 27, 1928.

J. R. DUNHAM 1,692,978

FLEXIBLE COUPLING

Filed June 15, 1927

Inventor:-
John R. Dunham,
by his Attorneys
Howson & Howson

Patented Nov. 27, 1928.

1,692,978

UNITED STATES PATENT OFFICE.

JOHN R. DUNHAM, OF HIGHLAND PARK, NEW JERSEY, ASSIGNOR TO JOHN WALDRON CORPORATION, OF NEW BRUNSWICK, NEW JERSEY, A CORPORATION OF NEW JERSEY.

FLEXIBLE COUPLING.

Application filed June 15, 1927. Serial No. 199,054.

This invention relates to improvements in flexible couplings, and more particularly in the means for anchoring the flexible elements or pins which connect the main coupling members.

The principal object of the invention is to provide anchoring means for the cylindrical keepers such that the keepers are positively prevented from rotating in the cylindrical recesses of the main coupling members which they occupy.

Figure 3:
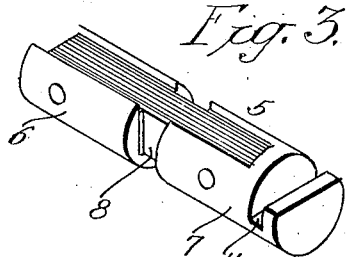
Fig. 3 is a detached perspective of the flexible coupling element.

With reference to the drawings, one type of coupling to which this invention is applicable consists of a pair of flanged coupling members 1 and 2 adapted to be attached to the adjacent ends of the shafts to be connected. The flange 3 of each of these coupling members is provided with transverse openings, 4 and 5 respectively, for reception of the keepers 6 and 7 of flexible elements or pins which connect the members 1 and 2 together. As shown in Fig. 3, these coupling pins comprise a flexible element 8 usually consisting of a bundle of flat steel shims whose ends are secured respectively in the keepers 6 and 7.

Figure 2:
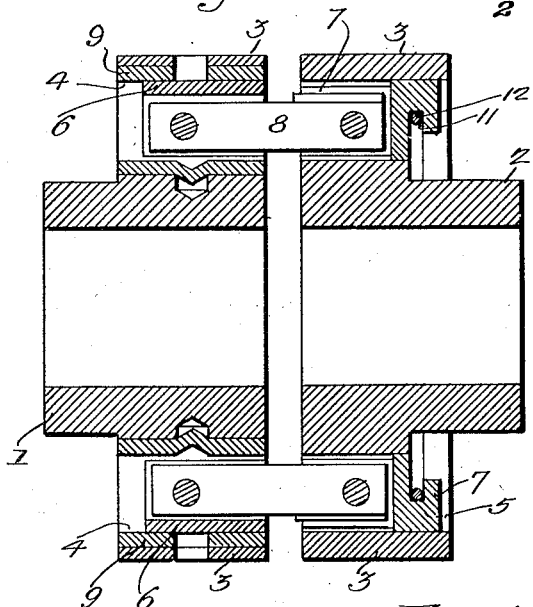
Fig. 2 is a section on the line 2—2, Fig. 1.

As shown in Fig. 2, the openings 4 of the member 1 are provided in the present instance with bushings 9 in which the keepers 6 slide, while the flange 3 of the member 2 is cut away on the inside to form an outwardly extending annular recess 10, which as illustrated intersects the inner sides of the openings 5 which receive the keepers 7. The keepers 7 are formed at their outer ends with a hook formation providing a recess 11 which registers with the recess 10 of the coupling member as illustrated, and a keeper element, usually in the form of a split ring, is adapted to be inserted in the slot 10 in which it expands into the recesses 11 in the keepers 7, thereby locking these keepers in the openings 5 and retaining the coupling pins in the proper position to connect the members 1 and 2.

Figure 1:
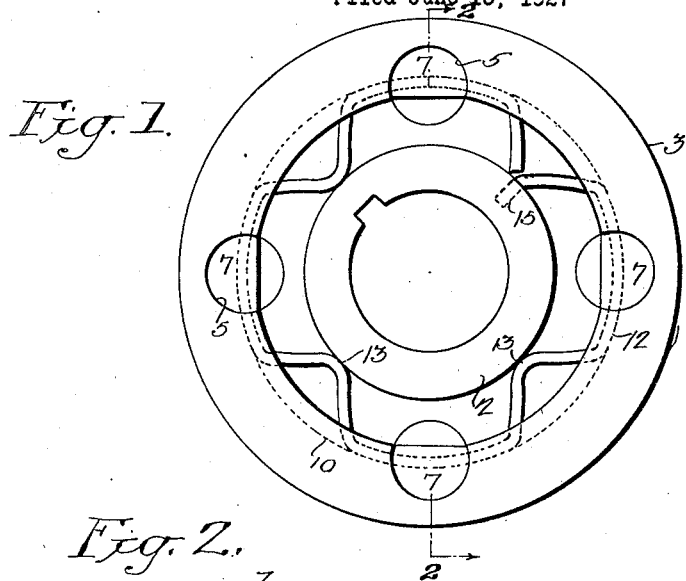
Figure 1 is an end view of a flexible coupling made in accordance with my invention.
Figure 4:
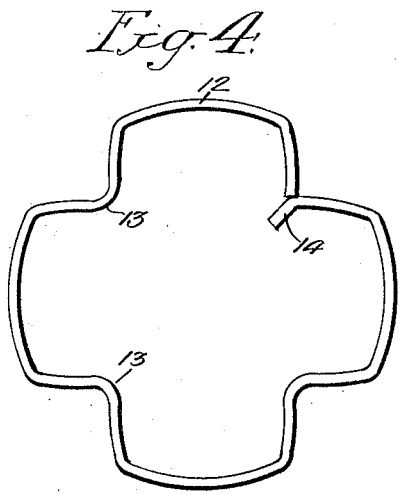
Fig. 4 is a view of the locking element.

Some difficulty has been experienced in the past owing to a tendency of the keepers 7 and 6 to rotate in the openings, and the split ring usually employed as the locking element is not always effective in preventing this rotation of the keepers. In the present instance, I provide instead of the usual true split ring an anchoring element 12 of the form shown in Fig. 4, this element departing from the true annulus by portions 13 thereof projecting inwardly to an extent such that when the element is in position as shown in Fig. 1, these inwardly projecting portions 13 rest against the hub of the member 2. The element 12, as clearly shown, is split or divided at one point, and one end 14 thereof is inserted in a recess 15 in the said hub provided for its reception which prevents angular movement of the locking element with respect to the member 2. Also the recess 15 is so placed that the inwardly projecting portions 13 of the element occupy positions between the cylindrical openings 5 in the flange 3 occupied by the keepers 7, so that the projecting portions of the element intermediate the parts 13 extend into the slot 10 and the recesses 11 in the keepers 7 in the usual manner to thereby anchor the keepers in the coupling member.

It will be noted by reference to Fig. 1 that the other extremity of the element 12 is turned in and is adapted to bear against the hub of the member 2 in the same manner as the parts 13, so that the element 12 is substantially symmetrical in form and includes an inturned hub meeting portion intermediate each adjacent pair of the openings 5. It will be apparent that by reason of these inturned parts which in assembly bear solidly upon the hub 2, the split locking element 12 cannot be flexed inwardly to an extent permitting the keepers 7 to rotate. The element 12, however, may easily be flexed to permit insertion or retraction of the element from the recess 10.

I claim:

1. A flexible coupling comprising a pair of coupling members having corresponding and registering series of cylindrical openings, flexible coupling pins connecting said members and comprising keepers adapted for insertion in said openings, at least one of the coupling members and the associated keepers of the coupling pin having registering transverse recesses, and a resilient split element carried in the recess of said coupling member and adapted to project into the recesses of the keepers to anchor them in said member, said element including parts projecting inwardly and in abutment with a surface of said member and preventing accidental contraction of said retaining element to an extent permitting rotation of the keepers in the coupling members.

2. A flexible coupling comprising a pair of coupling members each comprising a hub portion and a projecting flange having therein a series of cylindrical openings, the said openings of the said members corresponding in number and being adapted to register on lines parallel to the axis of rotation of said members, at least one of said coupling members and the associated keepers of the coupling pin having registering transverse recesses, and a resilient split element carried in the recess of said coupling member and adapted to project into the recesses of the keepers to anchor them in the member, said element being substantially annular in form and having inwardly projecting portions adapted in assembly to abut the hub of said member to prevent accidental contraction to an extent permitting rotation of the keepers in the coupling members.

3. A flexible coupling comprising a pair of coupling members each comprising a hub portion and a projecting flange having therein a series of cylindrical openings, the said openings of the said members corresponding in number and being adapted to register on lines parallel to the axis of rotation of said members, at least one of said coupling members and the associated keepers of the coupling pin having registering transverse recesses, a resilient split element carried in the recess of said coupling member and adapted to project into the recesses of the keepers to anchor them in the member, said element being substantially annular in form and having inwardly projecting portions adapted in assembly to abut the hub of said member to prevent accidental contraction to an extent permitting rotation of the keepers in the coupling members, and means for preventing angular movement of said locking element with respect to the coupling member in which it is mounted.

4. A flexible coupling comprising a pair of coupling members each comprising a hub portion and an outwardly extending flange having a series of cylindrical apertures whose axes are parallel to the axis of rotation of said members, one of said members having also an annular recess extending into the face of one of the flanges, with an extension at its inner end extending outwardly toward the periphery of the flange and intersecting the said cylindrical openings, flexible coupling pins for connecting said members and comprising keepers adapted for insertion in said openings, at least one keeper of each pin having a transverse recess, and a resilient split and substantially annular element adapted for insertion in the annular recess of the said coupling member and adapted to project outwardly and into the transverse recesses of the coupling pins to lock the pins in the coupling member and having inwardly extending portions engaging the coupling member at the bottom of the recess to prevent accidental contraction to an extent permitting rotation of the keepers in the coupling member.

JOHN R. DUNHAM.